(12) United States Patent
Shi et al.

(10) Patent No.: US 11,489,199 B2
(45) Date of Patent: Nov. 1, 2022

(54) NON-AQUEOUS ELECTROLYTE FOR LITHIUM ION BATTERY AND LITHIUM ION BATTERY

(71) Applicant: SHENZHEN CAPCHEM TECHNOLOGY CO., LTD., Guangdong (CN)

(72) Inventors: Qiao Shi, Guangdong (CN); Shiguang Hu, Guangdong (CN); Guanjie Ai, Guangdong (CN); Muchong Lin, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 417 days.

(21) Appl. No.: 16/640,055

(22) PCT Filed: Dec. 28, 2017

(86) PCT No.: PCT/CN2017/119290
§ 371 (c)(1),
(2) Date: Feb. 18, 2020

(87) PCT Pub. No.: WO2019/041696
PCT Pub. Date: Mar. 7, 2019

(65) Prior Publication Data
US 2020/0227784 A1 Jul. 16, 2020

(30) Foreign Application Priority Data
Aug. 30, 2017 (CN) .......................... 201710763113.0

(51) Int. Cl.
*H01M 10/0567* (2010.01)
*H01M 10/0565* (2010.01)
*H01M 10/0525* (2010.01)

(52) U.S. Cl.
CPC ... *H01M 10/0567* (2013.01); *H01M 10/0525* (2013.01); *H01M 10/0565* (2013.01); *H01M 2300/0025* (2013.01)

(58) Field of Classification Search
CPC ......... H01M 10/0525; H01M 10/0565; H01M 10/0567; H01M 2300/0025; H01M 2300/0085; H01M 4/131; H01M 4/136; H01M 4/505; H01M 4/525; H01M 4/5825
See application file for complete search history.

(56) References Cited

U.S. PATENT DOCUMENTS

| 5,849,429 A * | 12/1998 | Sazhin | H01M 10/4242 |
| | | | 429/49 |
| 2005/0053843 A1 | 3/2005 | Takahashi | |
| 2014/0205915 A1 | 7/2014 | Kim et al. | |
| 2014/0272553 A1 * | 9/2014 | Cheng | H01M 10/0567 |
| | | | 429/188 |
| 2016/0301104 A1 | 10/2016 | Shi et al. | |
| 2019/0097269 A1 * | 3/2019 | Cheng | H01M 4/483 |

FOREIGN PATENT DOCUMENTS

| CN | 101079503 A | 11/2007 |
| CN | 101162791 A | 4/2008 |
| CN | 102637894 A | 8/2012 |
| CN | 105119017 A | 12/2015 |
| CN | 108258311 A | 7/2018 |
| CN | 109417198 A | 3/2019 |
| EP | 1164653 A2 | 12/2001 |
| EP | 2219258 A1 | 8/2010 |
| EP | 3465812 | 12/2017 |
| JP | 2000123867 A | 4/2000 |
| KR | 20010095511 A | 11/2001 |
| WO | 2014144056 A1 | 9/2014 |

OTHER PUBLICATIONS

D. Aurbach, K. Gamolsky, B. Markovsky, Y. Gofer, M. Schmidt, U. Heider. On the use of vinylene carbonate (VC) as an additive to electrolyte solutions for Li-ion batteries, Electrochimica Acta 47 (2002) 1423-1439.*
International Search Report of PCT Patent Application No. PCT/CN2017/119290 dated May 24, 2018.
Search report of counterpart European Patent Application No. 17923318.4 dated May 27, 2020.
Thomas Dent, GPC/SEC Practical Tips and Tricks, Agilent Technologies, Oct. 2011, pp. 1-38, XP055608344.
Prof Premamoy Ghosh, Polymer Science Fundamentals of Polymer Science, Molecular Weights of Polymers, Sep. 21, 2006, XP055608363.

\* cited by examiner

*Primary Examiner* — Carlos Barcena

(57) ABSTRACT

In order to overcome the problems of influence of residual moisture, poor cycle performance and poor high-temperature storage performance in the existing lithium ion battery, the application provides a non-aqueous electrolyte for lithium ion battery, comprising a solvent, lithium salt and maleic anhydride copolymer, wherein the weight-average molecular weight of the maleic anhydride copolymer is less than or equal to 500,000; Furthermore, the percentage mass content of the maleic anhydride copolymer is 0.5% or more based on the total mass of the non-aqueous electrolyte being 100%. Meanwhile, the application also provides a lithium ion battery comprising the non-aqueous electrolyte. The non-aqueous electrolyte provided by the application is added with maleic anhydride copolymer with a content of more than 0.5% and a weight-average molecular weight of less than 500,000, so that the high-temperature storage and cycle performances of the lithium ion battery are effectively improved.

9 Claims, No Drawings

NON-AQUEOUS ELECTROLYTE FOR LITHIUM ION BATTERY AND LITHIUM ION BATTERY

TECHNICAL FIELD

The invention belongs to the technical field of lithium ion batteries, in particular to a non-aqueous electrolyte for lithium ion battery and a lithium ion battery.

BACKGROUND

Lithium ion batteries are currently mainly used in 3C digital consumer electronics, new energy power vehicles and energy storage because of their high working voltage, high safety, long service life, no memory effect and other characteristics. With the continuous improvement in the requirements of new energy vehicle endurance mileage and the continuous miniaturization of digital consumer electronics, high energy density has become the main development trend of Lithium ion batteries. Increasing the working voltage of lithium ion battery has become an effective way to increase the energy density of battery. The increase of working voltage of lithium ion battery can improve the energy density of battery, however, the increase of working voltage is very likely to deteriorate the performances of battery. Because, on the one hand, the crystal structure of the positive electrode of battery is unstable under the condition of high voltage, and during charging and discharging, the crystal structure of the positive electrode of battery will collapse, resulting in deterioration of performances. On the other hand, under high voltage, the surface of positive electrode is in a high oxidation state with high activity, which can easily catalyze the oxidative decomposition of the electrolyte. The decomposition products of electrolyte are likely to deposit on the surface of the positive electrode, blocking the diffusion channel of lithium ions, thus deteriorating the battery performances.

In a lithium ion battery, a Solid Electrolyte Interphase (SEI) film with a certain protective effect is formed on the positive and negative electrodes. In order to improve various performances of lithium ion battery, many researchers have improved the quality of the SEI film by adding different film-forming additives (such as vinylene carbonate, fluoroethylene carbonate and vinylethylene carbonate) to the electrolyte. So as to improve various performances of the battery. For example, Japanese Patent Laid-Open No. 2000-123867 discloses a way to improve the battery performances by adding vinylene carbonate to the electrolyte. The vinylene carbonate can take a reduction decomposition reaction on the surface of the negative electrode prior to solvent molecules, so as to form a passivation film on the surface of the negative electrode, preventing the electrolyte from further decomposing on the surface of the electrode, thereby improving the cycle performance of battery. However, after adding vinylene carbonate, the battery is prone to generate gas during high temperature storage, causing the battery to bulge. In addition, the passivation film formed with vinylene carbonate has a large impedance, especially at low temperature, which is prone to precipitate lithium during low-temperature charging process, affecting the safety of battery. Fluoroethylene carbonate can also form a passivation film on the surface of negative electrode to improve the cycle performance of battery, and the formed passivation film has a lower impedance, which can improve the low-temperature discharge performance of battery. However, fluoroethylene carbonate generates more gas during high temperature storage, significantly reducing the high-temperature storage performance of battery.

SUMMARY

Aiming at the problems that the existing lithium ion battery has the influence of residual moisture, poor cycle performance and poor high-temperature storage performance, the present application provides a non-aqueous electrolyte for lithium ion battery and a lithium ion battery to improve the cycle performance and high-temperature storage performance of lithium ion battery.

In order to solve the above technical problems, in one respect, this application provides a non-aqueous electrolyte for lithium ion battery, comprising a solvent, a lithium salt and a maleic anhydride copolymer, wherein the maleic anhydride copolymer has a weight-average molecular weight of less than or equal to 500,000; furthermore, the percentage mass content of the maleic anhydride copolymer is 0.5% or more based on the total mass of the non-aqueous electrolyte being 100%.

Optionally, the maleic anhydride copolymer is selected from a compound represented by the following structural formula,

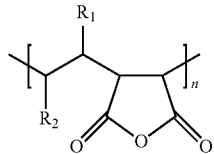

in the formula, $R_1$, $R_2$ are each independently selected from a hydrogen atom, halogen atom, —$OR_3$ or aryl group, wherein n is a positive integer and $R_3$ is a C1-C4 alkyl group.

Optionally, the maleic acid anhydride copolymer comprises at least one of the following compounds (I) to (IV),

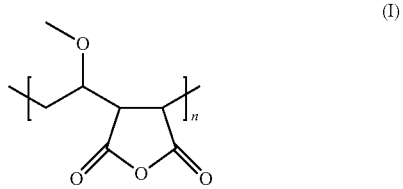
(I)

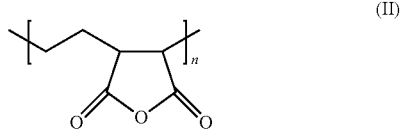
(II)

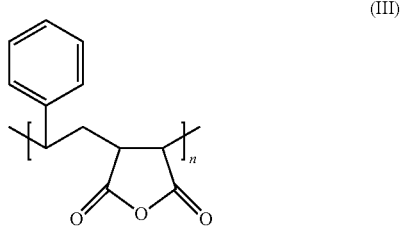
(III)

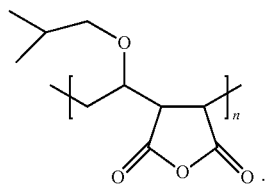
(IV)

Optionally, the viscosity of the non-aqueous electrolyte is 100 mPa·s or less.

Optionally, the percentage mass content of the maleic anhydride copolymer is 0.5-5% based on the total mass of the non-aqueous electrolyte being 100%.

Optionally, the water content in the non-aqueous electrolyte is below 100 ppm.

Optionally, the non-aqueous electrolyte further comprises at least one of unsaturated cyclic carbonate compound, fluorinated cyclic carbonate compound and sultone compound.

Optionally, the unsaturated cyclic carbonate compound comprises at least one of vinylene carbonate, vinylethylene carbonate, and methylene ethylene carbonate;

the fluorinated cyclic carbonate compound comprises fluoroethylene carbonate;

the sultone compound comprises at least one of 1,3-propane sultone, 1,4-butane sultone and 1,3-propylene sultone.

In another respect, the application also provides a lithium ion battery, comprising a positive electrode, a negative electrode, and a separator disposed between the positive electrode and the negative electrode, also, the lithium ion battery comprises the non-aqueous electrolyte for lithium ion battery as mentioned above.

Optionally, the positive electrode comprises a positive electrode active material, and the positive electrode active material is at least one of $LiNi_xCo_yMn_zL_{(1-x-y-z)}O_2$, $LiCo_xL_{(1-x')}O_2$, $LiNi_{x'}L'_{y'}Mn_{(2-x''-y')}O_4$ and $Li_zMPO_4$, wherein, L is at least one of Al, Sr, Mg, Ti, Ca, Zr, Zn, Si or Fe, $0 \leq x \leq 1$, $0 \leq y \leq 1$, $0 \leq z \leq 1$, $0 < x+y+z \leq 1$, $0 < x' \leq 1$, $0.3 \leq x'' \leq 0.6$, $0.01 \leq y' \leq 0.2$, L' is at least one of Co, Al, Sr, Mg, Ti, Ca, Zr, Zn, Si and Fe; $0.5 \leq z' \leq 1$, M is at least one of Fe, Mn and co.

The applicant discovered through a large number of experiments that when the maleic anhydride copolymer shown in the previous structural formula is added to the non-aqueous electrolyte for lithium ion battery, the high-temperature storage and cycle performance of the battery can be effectively improved only when the addition amount reaches more than 0.5% (based on the total mass of the non-aqueous electrolyte is 100%).

However, meanwhile, the applicant found that the battery is prone to serious deterioration of performance under the above-mentioned addition amount. Through a large number of experiments and researches, the applicant found that the weight-average molecular weight of the above-mentioned maleic anhydride copolymer has a great influence on battery performance. When the addition amount reaches more than 0.5%, the use of maleic anhydride copolymer with a weight-average molecular weight below 500,000 can effectively reduce the occurrence of lithium precipitation on negative electrode and avoid serious deterioration of battery performance. At the same time, when the non-aqueous electrolyte contains maleic anhydride copolymer with the above content range and weight-average molecular weight, the maleic anhydride copolymer can form a passivation film on the surface of positive electrode material during the first charging process of lithium ion battery, which can inhibit further decomposition of solvent molecules, and dissolution of metallic ions in positive electrode material, thereby improving the high-temperature storage and cycle performance of battery.

Under normal circumstances, water in the electrolyte can produce a series of side reactions with lithium hexafluorophosphate, resulting in deterioration of battery performance. It is generally believed in the industry that the control of electrolyte water content within 50 ppm will not have much impact on battery performance. However, when the electrolyte water content is too high (e.g., above 50 ppm), battery performance will obviously be deteriorated, and at the same time, a large amount of gas will be generated, resulting in expansion of battery, which presents potential safety hazards. In the present application, the applicant unexpectedly found that the maleic anhydride copolymer with a content of more than 0.5% and a weight-average molecular weight of less than 500,000 can reduce the influence of residual moisture in the non-aqueous electrolyte on battery performance to a certain extent. Even though the water content in the non-aqueous electrolyte reaches 100 ppm, the battery performance still does not significantly decrease. Therefore, the maleic anhydride copolymer with a content of more than 0.5% and a weight average molecular weight of less than 500,000 can be used in electrolyte to reduce the control standard for the water content in non-aqueous electrolyte while still ensuring the battery performance, which is beneficial to reducing the production and quality control costs.

DETAILED DESCRIPTION OF DISCLOSED EMBODIMENTS

In order to make the to-be-solved technical problems, technical solutions and beneficial effects more apparent and clearer, the present application will be described in further detail below with reference to embodiments. It should be understood that the specific embodiments described herein are only for the purpose of explaining the present invention and are not intended to limit the present invention.

The present application discloses a non-aqueous electrolyte for lithium ion battery, comprising a solvent, a lithium salt and a maleic anhydride copolymer, wherein the maleic anhydride copolymer has a weight-average molecular weight of less than or equal to 500,000; furthermore, the percentage mass content of the maleic anhydride copolymer is more than 0.5% based on the total mass of the non-aqueous electrolyte being 100%.

Preferably, the maleic anhydride copolymer has a weight-average molecular weight of less than or equal to 300,000.

In the process of trying to improve the performance of lithium ion battery, the applicant discovered through a large number of experiments that maleic anhydride copolymer with a content of more than 0.5% and a weight-average molecular weight of less than 500,000 has a beneficial improvement effect on the performance of lithium ion battery. It is presumed that the maleic anhydride copolymer with the above-mentioned content and the weight-average molecular weight can effectively improve the film forming quality of the non-aqueous electrolyte after being used as an additive of the non-aqueous electrolyte, thereby effectively improving the high-temperature storage and cycle performance of the lithium ion battery, reducing the occurrence of lithium precipitation on the negative electrode and avoiding serious deterioration of the battery performance. Meanwhile, the influence of residual moisture in non-aqueous electrolyte on battery performance can be reduced to a certain extent.

The maleic anhydride copolymer provided by the present application is selected from a compound represented by the following structural formula,

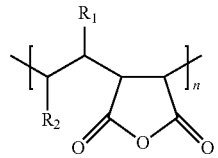

in the formula, $R_1$, $R_2$ are each independently selected from a hydrogen atom, halogen atom, $-OR_3$ or aryl group, wherein n is a positive integer and $R_3$ is a C1-C4 alkyl group. As known to those skilled in the art, C1-C4 alkyl refers to alkyl with 1-4 carbon atoms.

The maleic anhydride copolymer shown in the above structural formula can be regarded as a high molecular polymer formed by polymerization of maleic anhydride, olefine and its derivatives. The reaction conditions (such as reaction temperature and reaction time) of the corresponding polymerization reaction can be controlled according to the polymer synthesized as per specific requirements, so as to control the weight-average molecular weight of the synthesized maleic anhydride copolymer to keep the weight-average molecular weight within a certain range, which is well known to those skilled in the art and will not be described again.

The maleic anhydride copolymer described above can be obtained commercially or by self-manufacture.

Preferably, the maleic acid anhydride copolymer comprises at least one of the following compounds (I) to (IV),

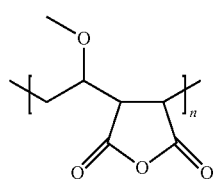

(I)

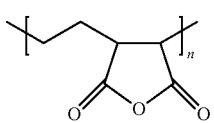

(II)

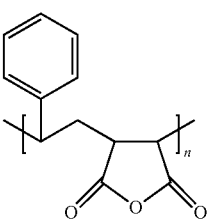

(III)

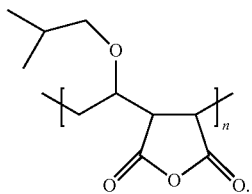

(IV)

According to the present application, in order to improve the conduction efficiency of lithium ions in the non-aqueous electrolyte, the viscosity of the non-aqueous electrolyte is less than or equal to 100 mPa·s, and more preferably, the viscosity of the non-aqueous electrolyte is less than or equal to 70 mPa·s.

According to the present application, the percentage mass content of the maleic anhydride copolymer is 0.5-5% based on the total mass of the non-aqueous electrolyte being 100%, and when the percentage mass content of the maleic anhydride copolymer is less than 0.5%, the high-temperature storage and cycle performance cannot be effectively improved; when the percentage mass content of the maleic anhydride copolymer is more than 5%, the overall performance of the battery could be easily affected negatively. Specifically, in the non-aqueous electrolyte, the percentage mass content of the maleic anhydride copolymer may be 0.5%, 0.6%, 0.8%, 1%, 1.2%, 1.5%, 1.8%, 2%, 2.5%, 3%, 3.5%, 4%, 4.5%, 5%.

According to the present application, the water content in the non-aqueous electrolyte is below 100 ppm.

As a common knowledge in this field, in the non-aqueous electrolyte of lithium ion battery, because the residual water can produce a series of side reactions with lithium hexafluorophosphate, the battery performance could be deteriorated, and at the same time a large amount of gas will be generated, causing the battery to bulge. Hence, the residual amount of water in non-aqueous electrolyte should be controlled as much as possible. Generally, the water content in electrolyte should be controlled below 50 ppm. In more stringent standards, the water content in electrolyte should be controlled below 20 ppm or even below 10 ppm.

According to the technical solution of the application, the maleic anhydride copolymer with the content of more than 0.5% and the weight-average molecular weight of less than 500,000 can reduce the influence of residual water in the non-aqueous electrolyte on the performance of battery, and even though the water content in the non-aqueous electrolyte reaches 100 ppm, the performance of the battery is not obviously reduced. Therefore, the water content of the non-aqueous electrolyte provided by the application can be controlled below 100 ppm.

The non-aqueous electrolyte provided by the application also comprises a lithium salt and a solvent.

The solvent may be a conventional organic solvent, and its specific substance and content are not particularly limited in the present application, which will not be described in detail.

Similarly, the lithium salt can also adopt the conventional substances, such as $LiPF_6$ and $LiBF_4$. The content of lithium salt in the non-aqueous electrolyte can be conventional, which will not be described again.

The non-aqueous electrolyte provided by the application further comprises at least one of unsaturated cyclic carbonate compound, fluorinated cyclic carbonate compound and sultone compound.

Preferably, the unsaturated cyclic carbonate compound comprises at least one of vinylene carbonate, vinylethylene carbonate, and methylene ethylene carbonate. The content of the unsaturated cyclic carbonate compound is 0.1-5% based on the total mass of the lithium ion battery non-aqueous electrolyte being 100%.

The fluorinated cyclic carbonate compound comprises fluoroethylene carbonate. The content of the fluorinated cyclic carbonate compound is 0.1-30% based on the total mass of the non-aqueous electrolyte of lithium ion battery being 100%.

The sultone compound comprises at least one of 1,3-propane sultone, 1,4-butane sultone and 1,3-propylene sultone. The percentage mass content of the sultone compound is 0.1-5% based on the total mass of the non-aqueous electrolyte for lithium ion battery being 100%.

The present application further provides a lithium ion battery, comprising the non-aqueous electrolyte for lithium ion battery as described above.

The lithium ion battery provided by the application comprises a positive electrode, a negative electrode, and a separator disposed between the positive electrode and the negative electrode. The positive electrode, negative electrode and separator are immersed in the non-aqueous electrolyte.

The positive electrode comprises a positive electrode active material, and the positive electrode active material is at least one of $LiNi_xCo_yMn_zL_{(1-x-y-z)}O_2$, $LiCo_{x'}L_{(1-x')}O_2$, $LiNi_{x''}L'_{y'}Mn_{(2-x''-y')}O_4$ and $Li_zMPO_4$, wherein, L is at least one of Al, Sr, Mg, Ti, Ca, Zr, Zn, Si or Fe, $0 \leq x \leq 1$, $0 \leq y \leq 1$, $0 \leq z \leq 1$, $0 < x+y+z \leq 1$, $0 < x' \leq 1$, $0.3 \leq x'' \leq 0.6$, $0.01 \leq y' \leq 0.2$, L' is at least one of Co, Al, Sr, Mg, Ti, Ca, Zr, Zn, Si and Fe; $0.5 \leq z' \leq 1$, M is at least one of Fe, Mn and co.

The negative electrode includes a negative electrode active material, which may be made of carbon material, metal alloy, lithium-containing oxide, and silicon-containing material.

The present application will be further described by the following embodiments.

Embodiment 1

This embodiment will illustrate the preparation method of the non-aqueous electrolyte and lithium ion battery disclosed by the application.

1) Preparation of Non-Aqueous Electrolyte

Ethylene carbonate (EC), diethyl carbonate (DEC) and ethyl methyl carbonate (EMC) were mixed according to the mass ratio of EC:DEC:EMC=1:1:1, then lithium hexafluorophosphate ($LiPF_6$) was added until the molar concentration was 1 mol/L, and then Compound 1 with content of 1% of the total mass of the electrolyte was added.

2) Preparation of Positive Electrode Plate

According to the mass ratio of 93:4:3, the positive electrode active material lithium nickel cobalt manganese oxide ($LiNi_{0.5}Co_{0.2}Mn_{0.3}O_2$), conductive carbon black Super-P and binder polyvinylidene fluoride (PVDF) were mixed, and then the mixture was dispersed in N-methyl-2-pyrrolidone (NMP) to obtain positive electrode slurry. The positive electrode slurry was uniformly coated on both sides of aluminum foil, then dried, calendered and vacuum dried, and then aluminum lead wire was welded by ultrasonic welding machine to obtain a positive electrode plate, the thickness of the positive electrode plate is 120-150 μm.

3) Preparation of Negative Electrode Plate

According to the mass ratio of 94:1:2.5:2.5, the negative electrode active material artificial graphite, conductive carbon black Super-P, binder styrene butadiene rubber (SBR) and carboxymethyl cellulose (CMC) were mixed, and then the mixture was dispersed in deionized water to obtain negative electrode slurry. The slurry was coated on both sides of copper foil, then dried, calendered and vacuum dried, and then nickel lead wire was welded by ultrasonic welding machine to obtain a negative electrode plate, the thickness of the negative electrode plate is 120-150 μm.

4) Preparation of Battery Core A three-layer separator film with single layer thickness of 20 μm was placed between the positive electrode plate and the negative electrode plate, and then the laminated structure consisting of the positive electrode plate, the negative electrode plate and the separator was wound to obtain a wound body. Then the wound body was flattened and put into an aluminum foil packaging bag, baked in vacuum at 75° C. for 48 h to obtain a core to be injected with liquid.

5) Liquid Injection and Formation of the Battery Core

In a glove box with the dew point controlled below −40° C., the non-aqueous electrolyte prepared above was injected into the battery core, then sealed in vacuum and allowed to stand for 24 hours.

Then, the routine formation of First Charge was performed according to the following steps: charged with 0.05 C constant current for 180 min, then charged to 3.95V with 0.2 C constant current, secondary vacuum sealing, then further charged to 4.2V with 0.2 C constant current, after being left at normal temperature for 24 hours, discharged to 3.0V with 0.2 C constant current.

Embodiments 2-16, Comparative Examples 1-12

The steps of Embodiment 1 were repeated except that the components and their contents for Embodiments 2-16 and Comparative Examples 1-12 are different, as shown in Table 1.

Performance Test

The batteries prepared in Embodiments 1-16 and Comparative Examples 1-12 were tested regarding the following performance:

High-Temperature Cycle Performance Test:

Place the battery in an oven with a constant temperature of 45° C., charge it to 4.2V with 1 C constant current, then charge it with a constant voltage until the current drops to 0.02 C, and then discharge it to 3.0V with a 1 C constant current. Repeat the steps, record the discharge capacity of the first cycle and the discharge capacity of the last cycle, then calculate the capacity retention rate of high-temperature cycle according to the following formula:

Capacity retention rate=discharge capacity of last cycle/discharge capacity of first cycle×100%

High-Temperature Storage Performance Test:

Charge the battery to 4.2V with 1 C constant current/constant voltage at normal temperature, measure the initial capacity and thickness of the battery, then store at 60° C. for 30 days, discharge to 3V with 1 C, measure the retention capacity, recovery capacity of the battery and the thickness of the battery after storage. The calculation formula is as follows:

Capacity retention rate (%)=retention capacity/initial capacity×100%;

Capacity recovery rate (%)=recovery capacity/initial capacity×100%;

Thickness expansion ratio (%)=(battery thickness after storage−initial battery thickness)/initial battery thickness×100%.

Low-Temperature Lithium Precipitation Test:

Cycle the battery for 3 times at normal temperature with 1 C current, then place the battery in a low temperature box with a constant temperature of 5° C., charge the battery to 4.2V with 0.3 C constant current, then charge the battery with a constant voltage until the current drops to 0.02 C, then take apart the battery in a glove box with a dew point below −40° C. and full of argon, observe whether there is lithium precipitation on the surface of the negative electrode.

The test results are shown in table 1.

aqueous electrolyte. In a certain range, with the increase of the weight-average molecular weight of maleic anhydride copolymer, the cycle performance and high-temperature storage performance of their corresponding lithium ion batteries were improved. When the weight-average molecular weight of maleic anhydride copolymer exceeded a certain value, the cycle performance and high-temperature storage performance of the corresponding lithium ion batteries showed a downward trend. Especially when the weight-average molecular weight of maleic anhydride copo-

TABLE 1

| | Maleic anhydride copolymer | | | Other | Water content of electrolyte/ppm | The 500th cycle capacity retention rate at 45° C. 1 C (%) | After 30 days of storage at 60° C. | | | Low-temperature lithium precipitation |
|---|---|---|---|---|---|---|---|---|---|---|
| | Specific substances | Molecular weight | Addition amount | additives and content | | | Capacity retention rate (%) | Capacity recovery rate (%) | Thickness expansion rate (%) | |
| Embodiment 1 | CompoundI | 1000 | 1% | — | 15.6 | 75.1 | 75.5 | 79.3 | 18.5 | No precipitation |
| Embodiment 2 | CompoundII | 5000 | 1% | — | 15.4 | 76.9 | 76.7 | 80.3 | 15.4 | No precipitation |
| Embodiment 3 | CompoundIII | 10,000 | 1% | — | 17.8 | 78.5 | 77.3 | 81.4 | 12.7 | No precipitation |
| Embodiment 4 | CompoundIV | 100,000 | 1% | — | 13.7 | 80.1 | 79.3 | 82.5 | 10.8 | No precipitation |
| Embodiment 5 | CompoundI | 300,000 | 1% | — | 17.8 | 82.1 | 80.8 | 85.5 | 10.1 | No precipitation |
| Embodiment 6 | CompoundI | 400,000 | 1% | — | 15.7 | 80.5 | 78.2 | 81.5 | 12.5 | No precipitation |
| Embodiment 7 | CompoundI | 200,000 | 0.5% | — | 13.5 | 75.5 | 81.5 | 85.5 | 10.5 | No precipitation |
| Embodiment 8 | CompoundI | 200,000 | 2% | — | 17.5 | 82.4 | 83.1 | 86.2 | 8.5 | No precipitation |
| Embodiment 9 | CompoundI | 200,000 | 3% | — | 14.5 | 84.2 | 84.2 | 87.5 | 7.5 | No precipitation |
| Embodiment 10 | CompoundI | 200,000 | 4% | — | 15.7 | 80.1 | 81.8 | 85.2 | 5.5 | No precipitation |
| Embodiment 11 | CompoundI | 200,000 | 2% | — | 70 | 81.5 | 82.4 | 85.1 | 9.5 | No precipitation |
| Embodiment 12 | CompoundI | 200,000 | 2% | — | 100 | 80.1 | 80.2 | 83.1 | 12.5 | No precipitation |
| Embodiment 13 | CompoundI | 200,000 | 2% | VEC: 1% | 14.3 | 86.7 | 85.3 | 88.4 | 7.2 | No precipitation |
| Embodiment 14 | CompoundI | 200,000 | 2% | FEC: 1% | 12.6 | 84.5 | 83.1 | 86.2 | 9.5 | No precipitation |
| Embodiment 15 | CompoundI | 200,000 | 2% | PS: 1% | 14.2 | 83.1 | 84.2 | 86.7 | 7.5 | No precipitation |
| Embodiment 16 | CompoundI | 200,000 | 2% | LiFSI: 1% | 16.4 | 83.8 | 84.8 | 87.4 | 8.1 | No precipitation |
| Comparative Example 1 | CompoundI | 700,000 | 1% | — | 16.8 | 60.3 | 65.4 | 67.8 | 30.2 | Large area precipitation |
| Comparative Example 2 | CompoundI | 2000,000 | 1% | — | 12.3 | 55.4 | 60.5 | 63.1 | 40.1 | Large area precipitation |
| Comparative Example 3 | — | — | — | — | 8.6 | 65.5 | 70.7 | 75.4 | 25.3 | No precipitation |
| Comparative Example 4 | — | — | — | — | 70 | 62.7 | 67.4 | 72.3 | 32.6 | Slight precipitation |
| Comparative Example 5 | — | — | — | — | 100 | 55.6 | 60.4 | 66.7 | 45.1 | Obvious precipitation |
| Comparative Example 6 | — | — | — | VEC: 1% | 12.4 | 77.6 | 80.3 | 84.5 | 12.6 | Obvious precipitation |
| Comparative Example 7 | — | — | — | FEC: 1% | 13.2 | 75.4 | 78.9 | 83.4 | 30.1 | No precipitation |
| Comparative Example 8 | — | — | — | PS: 1% | 15.6 | 71.3 | 79.8 | 84.2 | 11.6 | No precipitation |
| Comparative Example 9 | — | — | — | LiFSI: 1% | 14.7 | 74.6 | 77.6 | 81.5 | 16.5 | No precipitation |
| Comparative Example 10 | CompoundI | 700,000 | 2% | — | 70 | 56.4 | 63.3 | 66.7 | 32.2 | Large area precipitation |
| Comparative Example 11 | CompoundI | 200,000 | 0.1% | — | 13.6 | 66.7 | 70.4 | 75.1 | 24.8 | No precipitation |
| Comparative Example 12 | CompoundI | 200,000 | 0.1% | — | 70 | 64.6 | 68.5 | 73.6 | 27.5 | No precipitation |

Comparing the test results of Embodiments 1-4 and Comparative Examples 3-5, it can be seen that adding the maleic anhydride copolymer disclosed by the application with a content of more than 0.5% and a weight-average molecular weight of less than 500,000 to the non-aqueous electrolyte for lithium ion battery can effectively improve the cycle performance and the high-temperature storage performance of the lithium ion battery, with good low-temperature performance and no lithium precipitation.

Comparing the test results of Embodiments 1, 5, 6 and Comparative Examples 1, 2, it can be seen that when the content was more than 0.5%, the improvement of cycle performance and high-temperature storage performance of lithium ion battery was affected by the weight-average molecular weight of maleic anhydride copolymer in nonlymer exceeded 500,000, the cycle performance and high-temperature storage performance of the corresponding lithium ion batteries decreased significantly.

Comparing the test results of Embodiments 7-10 and Comparative Examples 11, it can be seen that the improvement of cycle performance and high-temperature storage performance of lithium ion battery was affected by the addition amount of maleic anhydride copolymer in non-aqueous electrolyte, and the effect of improving cycle performance and high-temperature storage performance of lithium ion battery was shown only when the content was above 0.5%. With the increase of mass percentage of maleic anhydride copolymer, the cycle performance and high-temperature storage performance of the corresponding lithium ion batteries were improved. When the mass percentage of maleic anhydride copolymer exceeded a certain value, the cycle performance and high-temperature storage performance of the corresponding lithium ion batteries showed a downward trend.

Comparing the test results of Embodiments 8, 11, 12 and Comparative Examples 4, 5, it can be seen that adding maleic anhydride copolymer with a content of more than 0.5% and a weight-average molecular weight of less than 500,000 to the non-aqueous electrolyte can effectively reduce the influence of residual water in the non-aqueous electrolyte on the battery performance. When the addition amount was above 0.5 and the weight-average molecular weight was above 500,000, maleic anhydride copolymer cannot effectively reduce the influence of residual water in non-aqueous electrolyte on the battery performance. Meanwhile, the test results of Embodiment 11 and Comparative Example 12 showed that when the addition amount was less than 0.5, even if maleic anhydride copolymer with a weight-average molecular weight of less than 500,000 was used, the influence of residual water in non-aqueous electrolyte on battery performance cannot be effectively reduced, and the cycle performance and high-temperature storage performance of the battery cannot be effectively improved.

Comparing the test results of Embodiments 8, 13-16 and Comparative Examples 6-9, it can be seen that compared with the method of adding maleic anhydride copolymer, vinylethylene carbonate (VEC), fluoroethylene carbonate (FEC), 1,3-propane sultone or imidodisulfuryl fluoride lithium (LiFSI) alone, the method of combining maleic anhydride copolymer with vinylethylene carbonate (VEC), fluoroethylene carbonate (FEC), 1,3-propane sultone or imidodisulfuryl fluoride lithium (LiFSI) respectively is more conducive to the improvement of cycle performance and high-temperature storage performance of lithium ion battery.

In this specification and the appended claims, the singular forms "a," "an," and "the" include plural reference, unless the context clearly dictates otherwise. The above descriptions are only preferred embodiments and are not intended to limit the present invention. Any modifications, equivalent substitutions and improvements made within the spirit and principles of the present invention shall be included within the scope of protection of the present invention.

What is claimed is:

1. A non-aqueous electrolyte for lithium ion battery, characterized by comprising a solvent, a lithium salt and a maleic anhydride copolymer, wherein the maleic anhydride copolymer has a weight-average molecular weight of more than or equal to 10,000 and less than or equal to 500,000, and a water content in the non-aqueous electrolyte is 50 ppm to 100 ppm; furthermore, the percentage mass content of the maleic anhydride copolymer is 0.5% or more based on the total mass of the non-aqueous electrolyte being 100%.

2. The non-aqueous electrolyte for lithium ion battery of claim 1, wherein the maleic anhydride copolymer is selected from a compound represented by the following structural formula,

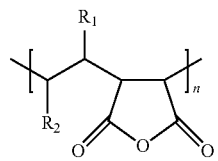

in the formula, $R_1$, $R_2$ are each independently selected from a hydrogen atom, halogen atom, —$OR_3$ or aryl group, wherein n is a positive integer and $R_3$ is a C1-C4 alkyl group.

3. The non-aqueous electrolyte for lithium ion battery of claim 2, wherein the maleic acid anhydride copolymer comprises at least one of the following compounds (I) to (IV),

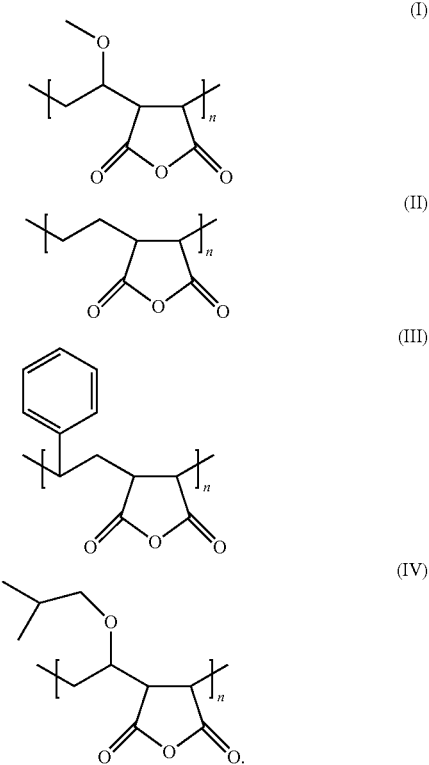

4. The non-aqueous electrolyte for lithium ion battery of claim 1, wherein the viscosity of the non-aqueous electrolyte is 100 mPa·s or less.

5. The non-aqueous electrolyte for lithium ion battery of claim 1, wherein the percentage mass content of the maleic anhydride copolymer is 0.5-5% based on the total mass of the non-aqueous electrolyte being 100%.

6. The non-aqueous electrolyte for lithium ion battery of claim 1, wherein the non-aqueous electrolyte further comprises at least one of unsaturated cyclic carbonate compound, fluorinated cyclic carbonate compound and sultone compound.

7. The non-aqueous electrolyte for lithium ion battery of claim 6, wherein the unsaturated cyclic carbonate compound comprises at least one of vinylene carbonate, vinylethylene carbonate, and methylene ethylene carbonate;
the fluorinated cyclic carbonate compound comprises fluoroethylene carbonate;
the sultone compound comprises at least one of 1,3-propane sultone, 1,4-butane sultone and 1,3-propylene sultone.

8. A lithium ion battery, comprising a positive electrode, a negative electrode, and a separator disposed between the positive electrode and the negative electrode, characterized by further comprising the non-aqueous electrolyte for lithium ion battery of claim 1.

9. The lithium ion battery of claim 8, wherein the positive electrode comprises a positive electrode active material, and the positive electrode active material is at least one of $LiNi_xCo_yMn_zL_{(1-x-y-z)}O_2$, $LiCo_{x'}L'_{(1-x')}O_2$, $LiNi_{x''}L'_{y'}Mn_{(2-x''-y')}O_4$ and $Li_zMPO_4$, wherein, L is at least one of Al, Sr, Mg, Ti, Ca, Zr, Zn, Si or Fe, $0 \le x \le 1$, $0 \le y \le 1$, $0 \le z \le 1$, $0 < x+y+z \le 1$, $0 < x' \le 1$, $0.3 \le x'' \le 0.6$, $0.01 \le y' \le 0.2$, L' is at least one of Co, Al, Sr, Mg, Ti, Ca, Zr, Zn, Si and Fe; $0.5 \le z' \le 1$, M is at least one of Fe, Mn and co.

\* \* \* \* \*